United States Patent [19]

Petri

[11] Patent Number: 5,666,349
[45] Date of Patent: Sep. 9, 1997

[54] METHOD FOR CONTROLLING COMPONENTS OF A COMMUNICATION SYSTEM

[75] Inventor: Bernhard Petri, Munich, Germany

[73] Assignee: Siemens Aktiengesellschaft, Munich, Germany

[21] Appl. No.: 704,148

[22] Filed: Aug. 28, 1996

Related U.S. Application Data

[63] Continuation of Ser. No. 350,675, Dec. 7, 1994, abandoned.

[30] Foreign Application Priority Data

Dec. 8, 1993 [DE] Germany .............. 43 41 888.0

[51] Int. Cl.$^6$ ............................ H04T 3/12
[52] U.S. Cl. .............. 370/360; 379/165; 370/384; 370/410; 370/522
[58] Field of Search .............. 370/216, 351, 370/352, 357, 360, 384, 385, 389, 400, 409, 410; 379/165, 220, 221, 229, 230; 340/827

[56] References Cited

U.S. PATENT DOCUMENTS

| 5,268,895 | 12/1993 | Topper ................................. | 370/385 |
| 5,357,508 | 10/1994 | Le Boudec et al. ................. | 370/409 |
| 5,375,124 | 12/1994 | D'Ambrogio et al. .............. | 370/420 |
| 5,381,405 | 1/1995 | Daugherty et al. ................. | 370/355 |
| 5,386,417 | 1/1995 | Daugherty et al. ................. | 370/352 |
| 5,434,852 | 7/1995 | La Porta et al. ..................... | 370/385 |
| 5,473,677 | 12/1995 | D'Amato et al. .................... | 379/201 |
| 5,473,679 | 12/1995 | La Porta et al. ..................... | 370/410 |

FOREIGN PATENT DOCUMENTS

| WO94/06251 | 3/1994 | Sweden . |
| 2273224 | 6/1994 | United Kingdom . |

OTHER PUBLICATIONS

"B–ISDN Uni Signaling Specification Baseline Document For Releases To And Beyond Future Releases", ITU–Telecommunication Standardization Sector, Study Group II, Geneva, 3–19 May 1993, pp. 1–28.

"Integration In Drei Schritten", E. Brill et al, (1993) Nos. 7–8, pp. 326–329.

"A Signaling Protocol For Complex Multimedia Services", Steven Minzer, IEEE Journal on Selected Areas in Communications, vol. 9, No. 9, Dec. 1991, pp. 1383–1394.

*Primary Examiner*—Alpus H. Hsu
*Assistant Examiner*—Seema S. Rao
*Attorney, Agent, or Firm*—Hill, Steadman & Simpson

[57] ABSTRACT

Components are controlled in a communication system composed at least of a network for transmitting digital communication signals. The network has at least one switching equipment and communication terminal equipment allocated to subscribers multipoint-multiconnection call set up. The components respectively contain control units for controlling a call set up, whereby one component is respectively controlled with signalization information in the form of messages communicated over the network from a different component. Each message contains at least one protocol and message identification, attributes of the object of call, subscriber and connection with object identification numbers for each of the individual objects. Each message also contains information about the relationships between different objects. The information elements of objects are contained in a message independently of the relationship to the other objects. Over and above this, each message separately contains information about the relationships between different objects. The control unit of the controlled component identifies the relationships between the objects on the basis of these additional information.

10 Claims, 3 Drawing Sheets

```
Protocol Related Information Elements
• Protocol Discriminator
• Message Type
• Compatibility Information
• Message Length Call Object Related Information Elements
• Call Reference
• Type of Call
• Global Join Reference (GJR)
• Charging Distribution Type
• Overall Service Type
• Root Identification / Call Center Identification
• Call State
• (...)

Party Object Related Information Elements
• Party Number 1
   - Party Reference
   - Called-Party Number
   - Called Party Subaddress
   - Party State
   - Party-to-Call Status
   - (...)
• Party Number 2
   - (...)
• Party Number m
   - (...)

Connection Object Related Information Elements
• Connection Number 1
   - Connection Reference
   - AAL Parameter
   - ATM User Cell Rate
   - Broadband Bearer Capability
   - Broadband High Layer Information
   - Broadband Low Layer Information
   - Connection Identifier (VPCI/VCI)
   - Connection State
   - End-to-End Transit Delay
   - QOS Parameter
   - Restart Indicator
   - Transit Network Selection
   - (...)
• Connection Number 2
   - (...)
• Connection Number n
   - (...)

Relationships between Objects
• Party-Connection-Mapping (PCM)
• Mapping between Overall Service Type and Connections
• Differential Delay Constraints between Specific Connections
• Party Groups
• (...)
```

FIG 3

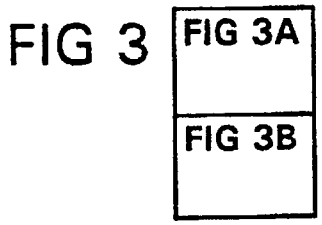

FIG 3 A

Protocol Related Information Elements
- Protocol Discriminator
- Message Type
- Compatibility Information
- Message Length

Call Object Related Information Elements
- Call Reference
- Type of Call
- Global Join Reference (GJR)
- Charging Distribution Type
- Overall Service Type
- Root Identification / Call Center Identification
- Call State
- (...)

Party Object Related Information Elements
- Party Number 1
  - Party Reference
  - Callend-Party Number
  - Callend Party Subaddress
  - Party State
  - Party-to-Call Status
  - (...)
- Party Number 2
  - (...)
- Party Number m
  - (...)

Connection Object Related Information Elements
- Connection Number 1
  - Connection Reference
  - AAL Parameter
  - ATM User Cell Rate
  - Broadband Bearer Capability
  - Broadband High Layer Information
  - Broadband Low Layer Information
  - Connection Identifier (VPCI/VCI)
  - Connection State
  - End-to-End Transit Delay
  - QOS Parameter
  - Restart Indicator
  - Transit Network Selection
  - (...)
- Connection Number 2
  - (...)
- Connection Number n
  - (...)

Relationships between Objects
- Party-Connection-Mapping (PCM)
- Mapping between Overall Service Type and Connections
- Differential Delay Constraints between Specific Connections
- Party Groups
- (...)

METHOD FOR CONTROLLING COMPONENTS OF A COMMUNICATION SYSTEM

This is a continuation of application Ser. No. 08/350,675, filed Dec. 7, 1994 now abandoned.

BACKGROUND OF THE INVENTION

The present invention is directed to a method for controlling components of a communication system with which a multipoint-multiconnection call set up is possible. The system is composed of at least one network for transmitting digital communication signals having at least one switching equipment and of communication terminal equipment allocated to subscribers. In this context, components can be communication terminal equipment, private branch exchanges, switching equipment (switch), etc. Individual components are thereby respectively controlled by signaling information in the form of messages communicated from a different component over a part of the network. Each message contains at least one protocol and message identifier, attributes of the objects of call, of subscriber and of connection with call, subscriber and connection identification numbers, respectively, permanently allocated at least locally to the call for the duration of a call for each of the individual objects. Moreover, information about the relationships between different objects are contained in each message, for example which connections are allocated to which subscribers or which different connections should have a common route management.

In previous communication systems, a call within the network is set up from a call center or, respectively, calling subscriber to a single subscriber, whereby a single connection is provided. A simple set up of messages of the signaling information is thereby possible with a protocol and message identifier, a call number, the attributes of the called subscriber and the attributes of the connection. Beginning with the second expansion level (release 2) of the broadband ISDN referred to in the article "Integration in Drei Schritten", E. Brill, M. N. Huber, B. Petri, net 47 (1993), nos. 7–8 pp. 326–329, support is required for multipoint-multiconnection call relationships in the network.

The article "B-ISDN UNI SIGNALING SPECIFICATION BASELINE DOCUMENT FOR RELEASE TO AND BEYOND FUTURE RELEASES", ITU-Telecommunication Standardization Sector, Study Group 11, Geneva, 3–19 May 1993, discloses a control method for supporting multipoint-multiconnection call relationships in the network wherein information elements of the individual objects are hierarchically grouped within a message. As a result the control unit of a control communication system component can recognize a relationship between the individual objects on the basis of the sequence of the received information elements. This can be well-recognized in the examples for message formats of a multiconnection call and of a multisubscriber call that are shown in FIGS. 2 and 3A on pages 7 and 8 of the aforementioned baseline document. The subscriber attributes, for example, are thereby higher-ranking in FIG. 2, so that connection attributes are transmitted for every individual subscriber with information elements of the specific attributes of every individual connection that are valid for this subscriber. When provided, an identification number of a group of connections that traverse the same route in the network is undertaken for every subscriber (common route connection group). Here and in the following use of the term, an identification number means an unambiguous designation, for example a group of numerals and/or letters and/or special characters.

All connection attributes are thus transmitted per subscriber and results in substantial information redundancy. The physical signalization signals transmitted in the level 1 contain the message in the message format offered by the controlling component, so that a large number of unnecessary signalization data signals must be transmitted between the controlling component and the component to be controlled. Every additional relationship between the objects of the call, i.e. between call, subscriber and/or connection, requires an additional hierarchy level within the structure. Given partial overlap of common relationships, complications can thereby arise, particularly when a plurality of differently configured connections are to be set up on a partially shared route between a plurality of subscribers. In this case, the required signalization information contains a great deal of redundancy and a modification or, respectively, expansion of the relationships between the objects within a call requires an involved message modification.

SUMMARY OF THE INVENTION

It is an object of the present invention to provide a method for controlling components of a communication system wherein there is less redundancy in the transmission of signalization information and that enables an easier expansion of the relationships between the objects of a call.

In general terms the present invention is a method for controlling components having control units for controlling a call set up in a communication system composed of at least one network for the transmission of digital communication signals. The at least one network has at least one switching equipment and communication terminal equipment allocated to subscribers for multipoint-multiconnection call set up. The method has the steps of: controlling a selected component with signalization information in the form of messages communicated over a part of the network from a different component; providing in each of these messages at least one protocol and message identifier, attributes of objects of call, subscriber and connection having object identification numbers for each of the individual objects permanently allocated at least locally to the call for the duration of a call; providing in each message information about the relationships between different objects; providing the attributes of objects contained in a message independently of a relationship of these objects to the other objects; separately providing in each message further information about relationships between different objects in the form of signalization data; and identifying via the control unit of the controlled component the relationships between the objects dependent on said separately contained information. In a development of the present invention the relationships between the objects are defined in a message by mutual allocation of identification numbers of individual objects in combination with an identification number f the respective type of relationship.

In a method of the prior art, the different objects of the controlling components are arranged dependent on their relationships to one another within a message, so that the information about the relationship between the individual objects of a call is contained in the arrangement of the objects within the message and the controlled component thus immediately recognizes a relationship between the individual objects on the basis of the sequence of the transmitted signalization information.

By comparison thereto, the information elements of the objects in a method of the present invention are contained in a message independently of their relationship to the other objects. Over and above this, every message separately contains information about the relationships between different objects and the control unit of the controlled component identifies the relationships between the objects on the basis of such additional information. In a beneficial embodiment of the present invention, an object number is allocated to every object within a call, i.e. a call number to every call, a subscriber number to every subscriber and a connection number to every connection. The information about the relationships between the objects separately contained in the message are defined by the allocation to one another of the corresponding object numbers in combination with an identification number about the respective type of relationship.

In a method of the present invention, it is not necessary to multiply transmit the attributes of individual objects from the controlling component to the component to be controlled. Both the structure and the transmission of messages within a controlling component as well as the reading and processing of messages within a controlled component are thereby shortened and simplified. Over and above this, fewer signalization data signals have to be transmitted between the components. The time saving within the controlled component achieved by reading shorter signalization information is thereby greater than the calculating outlay to be additionally performed by the control unit of the controlled component, namely in order to undertake an allocation of the objects to one another from the separately transmitted information about the relationships of the individual objects.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 depicts the relationship of FIGS. 3A and 3B; and

FIGS. 3A and 3B depict an exemplary embodiment of the structure of a message of a type that can be employed in the method of the present invention.

DESCRIPTION OF THE PREFERRED EMBODIMENTS

Figure 1:
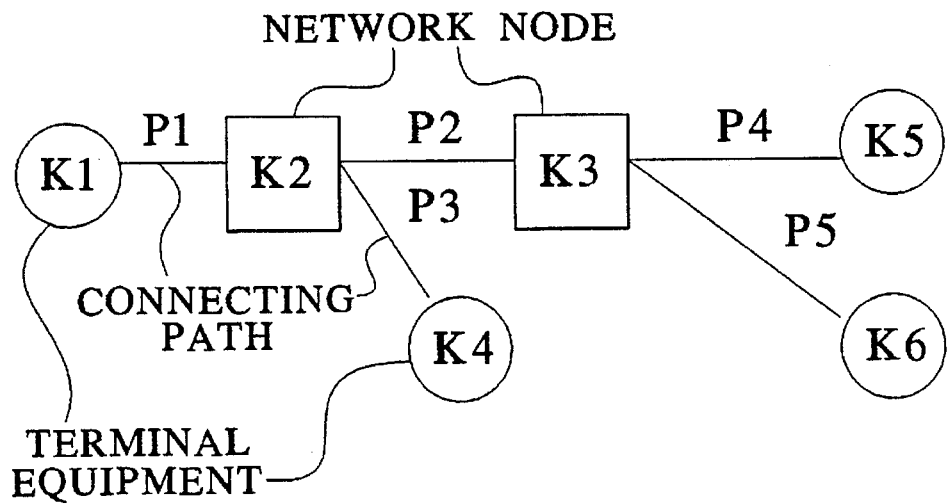
FIG. 1 depicts a communication system shown in the form of a block diagram for the implementation of the method of the present invention.

FIG. 1 shows the schematic illustration of a communication system composed of components K1, K2, K3, K4, K5 and K6 and of network parts P1, P2, P3, P4 and P5. The components K1–K6 thereby respectively contain a control unit that is provided for, among other things, controlling a call set up. In the exemplary embodiment shown in FIG. 1, respective communication terminal equipment such as, for example, telephone terminal equipment, fax equipment and/or data terminal equipment are provided as components K1, K4, K5 and K6.

Connecting paths P1–P5 that, in common with the components K2 and K3, form a network of a communication system for the transmission of digital signals. The connecting paths P1, P2, P3, P4 and P5 can be, for example, trunks, radio relay paths, etc. The components K2 and K3 in the exemplary embodiment of FIG. 1 represent network nodes (switch).

Figure 2:
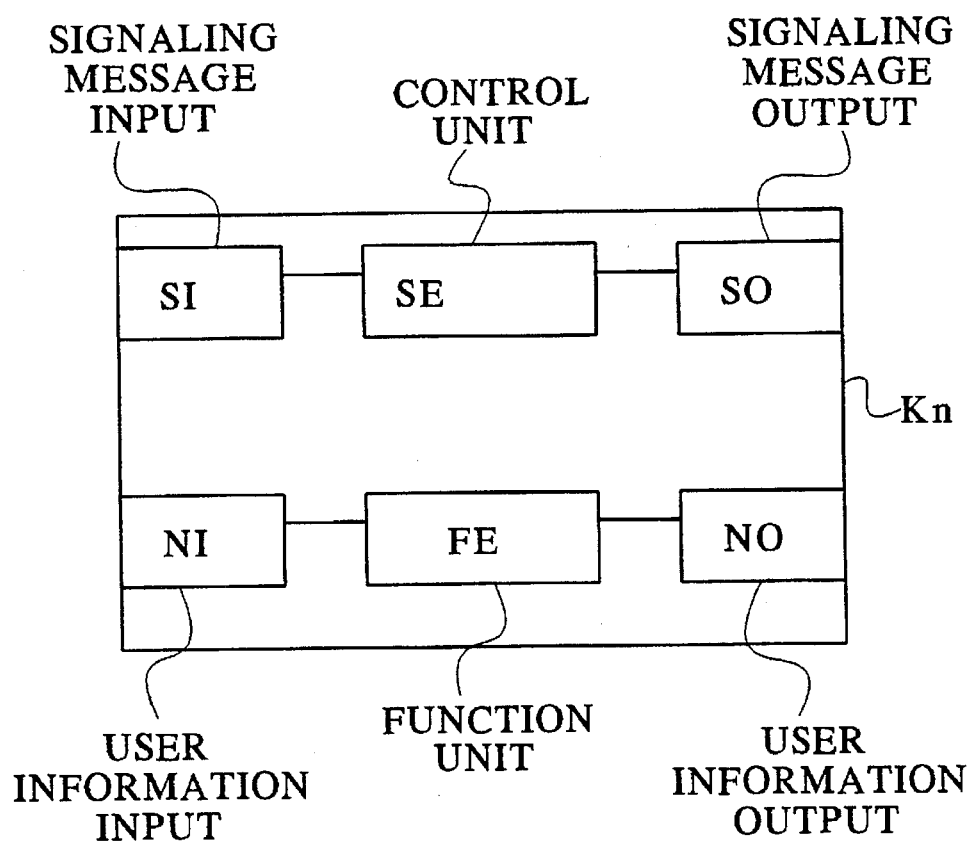
FIG. 2 depicts components of the communication system that are important to the present invention, and are shown in a block diagram.

FIG. 2 shows the block circuit diagram of a component Kn of a communication system of FIG. 1. The letter n thereby stands for a whole number between 1 and 6. As may be derived from FIG. 2, the component Kn contains a control unit SE that can receive signalization information via a signalization signal input SI and can output signalization information via a signalization signal output SO. When the component Kn contains a function unit FE that is controlled by the control unit SE and can receive useful information or, respectively, useful signals via a useful signal input circuit NI and can also output useful information or, respectively, useful signals via a useful signal output NO. The input circuits SI and NI as well as the output circuits SO and NO can each be respectively connected to allocated units (not shown) of transmission equipment P1–P5.

A component Kn can receive control information that define its control sequence from another component via the signalization signal input SI. Moreover, a component Kn can output signalization signals via the signalization signal output circuit SO that are transmitted to another component. As a result thereof, a component Kn can control another component.

For example, Kn can be a communication terminal equipment or a switching equipment. When the component Kn is the communication terminal equipment, then the signalization/transmission equipment of the communication terminal equipment is to be understood as functional unit FE that is followed by specific components such as, for example, printers, audio equipment or video equipment. When the component Kn is the switching equipment, then a switching network is provided as functional unit FE.

When, for example, the component K1 is a call originator and this call originator intends the set up of a call and a connection to component K6, then the component K1 controls the component K2 using a message that is transmitted over the path P1 and contains the required information. The component K2 correspondingly controls the component K3 via the path P2 and the component K3 correspondingly controls the component K6 via the path P5. Answer-backs to the controlling components are thereby potentially transmitted from the controlled components.

FIGS. 3A and 3B show the structure of an exemplary embodiment of a message for the implementation of a method of the present invention.

The message component "Protocol related information elements" indicates a group of information elements that are directed to the protocol employed and to the message. "Protocol discriminator" having the significance of a protocol identifier, "message type" having the significance of a message type, i.e. a message identifier, "compatibility information" having the significance of a compatibility information and "message length" having the significance of a particular about the length of the respective message are recited as examples of such information elements.

The group of information elements that then follows relate to the objects of call, subscriber and connection as well as to the relationships between parts of these objects.

The message component "Call object related information elements" refers to a group of information elements that relate to the object "call". Shown are the following examples. The "call reference" is a call identifier. "Type of call" or call type defines the rules according to which the call structure, i.e. the connections employed and the connected subscribers, can be modified. Examples of call types are. Call without permitting a call set up initiated by subscriber; and call with permission of an inquiry for a call set up by subscriber, but unconditionally with confirmation of the call set up by the call center. Call center can thereby be a call owner, i.e. the initiator of the call or, respectively, call origin or, on the other hand, can be an original subscriber who has assumed the call ownership. Given multipoint connections such as, for example, conference circuits or multiaddressed transmissions, the call center can, for example, be a central equipment such as a server. Another call type is a call wherein all switching equipment connected to the call are authorized to add subscribers to the call. A standard command for this purpose is ADD PARTY. A further call type is a call wherein all switching equipment connected to the call are authorized to add subscribers to the call but must inform the call owner or, respectively, the call center thereof. The element "Global Join Reference (GJR)" is an identification number that indicates to what extent subscribers are authorized to initiate a call set up to the call. The GJR is strictly coupled to the call type. In the call types set forth above by way of example, no GJR is specified in the first case and the GJRs specified for the third and fourth case differ from the GJR of the second case.

The element "Charging Distribution Type" defines who bears the costs of the call. For example, the call owner or call origin can bear all costs; however, the costs can also be distributed to all subscribers or to the subscribers and to the call owner. The element "Overall Service Type" or overall service type is used to specify different types of overall services such as, for example, mono-media multiconnection service, multimedia multiconnection service or multimedia conference service. The element "Root Identification/call Center Identification" or call origin/call owner identifier indicates a call center identifier and is required, for example, in order, given inquiries of subscribers with respect to a call set up, to guide a guidance of the inquiry to the call center. For example, the call center can thereby be a conference circuit server. The element "Call State" indicates the current status of the control of the call/connection set up (see feature "X.15" of the feature list "list of capabilities for SCS-2 of ETSI SPS 3 permanent document").

The message component "Party Object Related Information Elements" refers to a group of information elements that are related to the object "subscriber". In the illustrated exemplary embodiment, information elements with respect to "party number 1" are indicated for subscriber 1, "party number 2" for subscriber 2 as well as "party number m" for the subscriber m as last subscriber. The examples of information elements separately contained in a message for each subscriber are thereby only shown in detail for subscriber 1.

Shown are the following examples. The element "party reference" or subscriber identifier is an end point reference according to ATM format. It specifies a logical identification number of the subscriber within the call. This identification number is not a permanent attribute of a subscriber but can vary from call to call. The party reference or subscriber identification number must merely be respectively unambiguous at an interface between two components of a communication system. The element "called party number" refers to the telephone number of the called subscriber. The element "called party subaddress" refers to the subaddress of the called subscriber. The element "party state" or subscriber state corresponds to the "end point state" of the ATM format, phase 1 of the UNI specification and is employed as specified therein. The element "party-to-call status" or status of the subscriber with reference to the call or, respectively, subscriber status is an attribute that assigns a specific status to a subscriber for a specific call. For example, a subscriber can be viewed as being absolutely required for the creation and/or maintaining of a specific call. I.e., the call cannot occur or be maintained without the participation of this subscriber. In the case of special services, moreover, the subscriber status can define specific rights for modifying the call structure or the fee allocation, for example for specific subscribers.

The message component "connection object related information elements" refers to a group of information elements that are related to the object "connection". In the illustrated exemplary embodiment, information elements with respect to "connection number 1" are indicated for connection 1, "connection number 2" for the connection 2 as well as "connection number n" for the connection n as last subscriber. The examples of information elements separately contained in a message for each connection are thereby only shown in detail for the connection 1.

Shown are the following examples. The element "connection reference" or connection identification number. It specifies an identification number of the subscriber within the call. This identification number is not a permanent attribute of a connection but can vary from call to call. The connection reference or connection identification number must merely be respectively unambiguous at an interface between two components of a communication system. The element "AAL parameter" corresponds to a parameter of the ATM adaption layer (AAL is an abbreviation of the English-language expression "ATM adaption layer"). The element "ATM user cell rate" is the ATM cell transmission rate. The element "broadband error capability" is the properties of the basic transmission service. The element "broadband high layer information" is the broadband information of the service-dependent layers. The element "broadband low-layer information" is the broadband information of the service-independent layers (layers 1, 2 and 3). The element "connection identifier (VPCI/VCI)" is the call identifier with respect to the virtual path (VPCI) or, respectively, with respect to the virtual connection (VCI). The element "connection state" is the connection state corresponds to the "link state" of the ATM format phase 1 UNI protocol and is employed as specified therein. The element "end-to-end transit delay" is the transmission delay. The element "QOS parameter" is the quality of service parameter (from the English-language expression "quality of service"), for example for indicating various priority levels for the handling of various services. The element "restart indicator" is the restart identification number. The element "transit network selection" is the information elements with respect to the transmission network selection.

The message component "Relationships between objects" contains information about the relationships between objects. The information elements contained here in a message usually contain particulars about the respective type of relationship and about the objects between which the corresponding relationship exists. In many instances, a matrix (multiplexing scheme) is thereby especially beneficial as presentation type since the relationships between a respective plurality of different objects can be reproduced in a simple way as a result thereof.

Shown are the following examples of types of relationship. The element "party connection mapping (PCM)" is the subscriber connection mapping. This defines the relationship between the individual objects "subscriber and connection". As part of a message effecting a call set up, this information defines which subscribers (including a potential call owner)

are to be connected to which connections. In a message that effects the addition of subscriber connections to the call or the cancellation of subscriber connections, this information similarly defines what connection/connections is/are to be set up to or, respectively, cleared down from which subscriber. The element "mapping between overall service type and connections" denotes a mapping as to which service types are allocated to which connections. Such information, for example, can be contained in the form of a table. When, for example, a call is employed as a multimedia service for the transmission of the service components of audio, video and data, then, for example, a separate connection can be allocated to every service component, a common connection can be allocated to the service components of audio and video or a common connection can be allocated to all service components. The element "differential delay constraints between specific connections" is the limitation of the difference in delay time between specific connections that can, for example, be required in order to enable a synchronization of data received over various connections within higher layers, for example in order to suppress a time shift between video and audio. The element "common routing requirements between different connections" is the condition of a common routing of different connections. This information specifies the requirement that two or more connections are to be routed to the same subscriber via the same path. Among other things, this leads to the fact that the difference in delay time is especially slight. The element "party groups" are the subscriber groups. This information element shows that a plurality of subscribers are combined to form a subscriber group to which a subscriber group identification number is assigned. This subscriber group can be addressed in call set up operations and call clear down operations, so that a listing of the individual subscribers is not required.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling components having control units for controlling a call set up in a communication system composed of at least one network for the transmission of digital communication signals, the at least one network having at least one switching equipment and communication terminal equipment allocated to subscribers for multipoint-multiconnection call set up, the at least one switching equipment and communication terminal equipment being components of the communication system, comprising the steps of: controlling a first component via signaling in the form of messages communicated over a part of the network from a second component; providing in each of said messages at least one protocol and message identifier, attributes of object for a call, object for a subscriber and object for a connection having object identification numbers for each of individual objects permanently allocated at least locally to a call for the duration of the call; providing the attributes of objects contained in a message independently of a relationship between these objects and independently of their relationship to other objects; separately providing further information about relationships between different objects within each signalling message itself; and identifying via the control unit of the first component the relationships between the different objects dependent on said further information.

2. The method according to claim 1, wherein the relationships between different objects are defined in a message by mutual allocation of identification numbers of individual objects in combination with an identification number of a respective type of relationship.

3. The method according to claim 1, wherein the object identification numbers, defined for the duration of the call, are respectively defined only between two neighboring components in the network.

4. The method according to claim 1, wherein the object identification number of the call defined for the duration of the call, is unambiguously allocatable within a part of the communication system participating in the call set up.

5. A method for controlling components having control units for controlling a call set up in a communication system composed of at least one network for the transmission of digital communication signals, the at least one network having at least one switching equipment and communication terminal equipment allocated to subscribers for multipoint-multiconnection call set up, the at least one switching equipment and communication terminal equipment being components of the communication system, comprising the steps of: controlling a first component with messages communicated over a part of the network from a second component; providing in each of said messages at least one protocol and message identifier, attributes of object for a call, object for a subscriber and object for a connection having object identification numbers for each of individual objects permanently allocated at least locally to a call for a duration of the call; providing the attributes of objects contained in a message independently of a relationship between these objects and independently of their relationship to other objects; separately providing further information about relationships between different objects, the relationships between the objects being defined by mutual allocation of identification numbers of individual objects in combination with an identification number of a type of relationship; and identifying via the control unit of the first component the relationships between the objects dependent on said further information.

6. The method according to claim 5, wherein the object identification numbers, defined for the duration of the call, are respectively defined only between two neighboring components in the network.

7. The method according to claim 5, wherein the object identification number of the call defined for the duration of the call, is unambiguously allocatable within a part of the communication system participating in the call set up.

8. A method for controlling components having control units for controlling a call set up in a communication system composed of at least one network for the transmission of digital communication signals, the at least one network having at least one switching equipment and communication terminal equipment allocated to subscribers for multipoint-multiconnection call set up, the at least one switching equipment and communication terminal equipment being components of the communication system, comprising the steps of: selecting a first component; controlling the first component via signaling in the form of messages communicated over a part of the network from a second component; providing in each of said messages at least one protocol and message identifier, attributes of an object of call, attributes of an object of subscriber and attributes of an object of connection, respective object identification numbers for each of the objects permanently allocated at least locally to a call for a duration of the call; defining relationships between the objects by mutual allocation of identification numbers of individual objects in combination with an identification number of a respective type of relationship; providing in each message information about the relationships between different objects; providing the attributes of objects contained in a message independently of a relationship between these objects and independently of their relationship to other objects; separately providing further information about relationships between different objects; and identifying via the control unit of the first component the relationships between the object dependent on said further information.

9. The method according to claim 8, wherein the object identification numbers, defined for the duration of the call, are respectively defined only between two neighboring components in the network.

10. The method according to claim 8, wherein the object identification number of the call defined for the duration of the call, is unambiguously allocatable within a part of the communication system participating in the call set up.

* * * * *